United States Patent
Takeda et al.

(10) Patent No.: US 7,450,211 B2
(45) Date of Patent: Nov. 11, 2008

(54) LIQUID CRYSTAL DISPLAY DEVICE HAVING SPACER ARRANGED TO COVER PORTION OF PIXEL ELECTRODE OR RECTANGULAR SPACER ARRANGED ON GATE LINE BUT DOES NOT REACH SECOND SUBSTRATE

(75) Inventors: Arihiro Takeda, Sagamihara (JP); Takahiro Sasaki, Kawasaki (JP); Manabu Sawasaki, Kawasaki (JP)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 272 days.

(21) Appl. No.: 11/042,328

(22) Filed: Jan. 25, 2005

(65) Prior Publication Data
US 2005/0259209 A1 Nov. 24, 2005

(30) Foreign Application Priority Data
May 24, 2004 (JP) .............................. 2004-153923

(51) Int. Cl.
*G02F 1/1339* (2006.01)
(52) U.S. Cl. ..................................................... 349/155
(58) Field of Classification Search .................. 349/155
See application file for complete search history.

(56) References Cited

U.S. PATENT DOCUMENTS

| | | | |
|---|---|---|---|
| 6,356,335 B1 | 3/2002 | Kim et al. | |
| 6,661,488 B1 | 12/2003 | Takeda et al. | |
| 6,678,031 B2 | 1/2004 | Song | |
| 6,690,441 B2 | 2/2004 | Moriya | |
| 6,724,452 B1 | 4/2004 | Takeda et al. | |
| 6,870,593 B2 | 3/2005 | Satoh | |
| 7,247,411 B2 | 7/2007 | Song | |
| 2001/0026347 A1* | 10/2001 | Sawasaki et al. | 349/156 |
| 2001/0046023 A1* | 11/2001 | Melnik et al. | 349/155 |
| 2002/0039166 A1* | 4/2002 | Song | 349/156 |
| 2002/0067450 A1* | 6/2002 | Moriya | 349/129 |
| 2003/0048403 A1* | 3/2003 | Satoh | 349/156 |
| 2004/0119924 A1 | 6/2004 | Takeda et al. | |
| 2007/0216831 A1 | 9/2007 | Song | |

FOREIGN PATENT DOCUMENTS

| | | |
|---|---|---|
| CN | 1354383 | 6/2002 |
| JP | 10-048640 | 2/1998 |
| JP | 11-242211 | 9/1999 |
| JP | 11-242225 | 9/1999 |
| JP | 2000-305086 | 11/2000 |
| JP | 2002-107730 | 4/2002 |
| JP | 2002-162627 | 6/2002 |
| JP | 2002-287158 | 10/2002 |
| JP | 2003-84289 | 3/2003 |
| KR | 1999-006951 | 1/1999 |
| KR | 2000-0031955 | 6/2000 |

\* cited by examiner

*Primary Examiner*—David C. Nelms
*Assistant Examiner*—John S Heyman
(74) *Attorney, Agent, or Firm*—Greer, Burns & Crain, Ltd.

(57) ABSTRACT

A liquid crystal display device is disclosed that is capable of suppressing disorder of alignment of liquid crystal molecules caused by a spacer arranged between two TFT substrates. In liquid crystal display device, the spacer arranged between the two TFT substrates is capable of aligning liquid crystal molecules near the spacer along a specified direction.

16 Claims, 15 Drawing Sheets

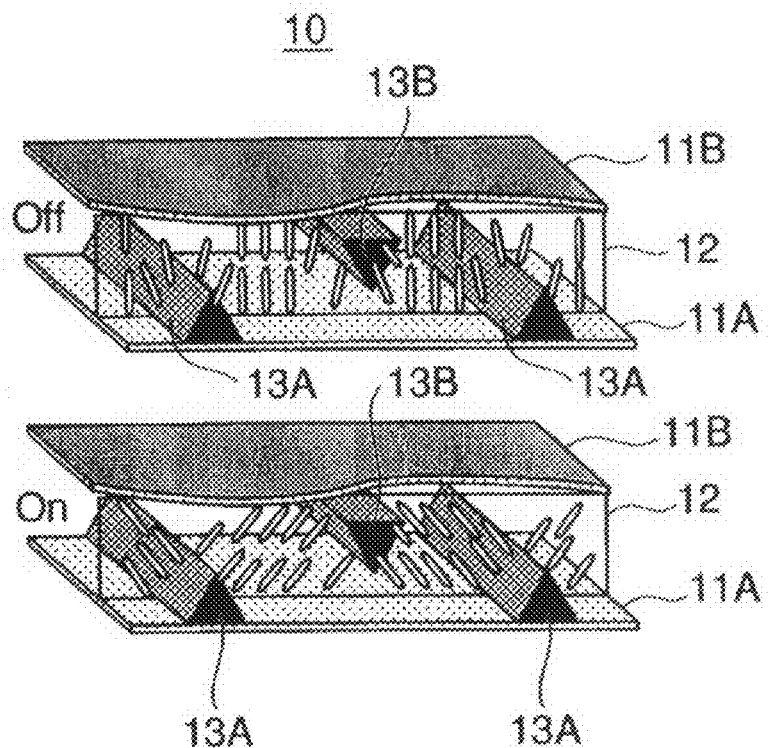

LIQUID CRYSTAL DISPLAY DEVICE HAVING SPACER ARRANGED TO COVER PORTION OF PIXEL ELECTRODE OR RECTANGULAR SPACER ARRANGED ON GATE LINE BUT DOES NOT REACH SECOND SUBSTRATE

CROSS-REFERENCE TO RELATED APPLICATION

This patent application is based on Japanese Priority Patent Application No. 2004-153923 filed on May 24, 2004, the entire contents of which are hereby incorporated by reference.

BACKGROUND OF THE INVENTION

1. Field of the Invention

The present invention generally relates to a liquid crystal display device, and particularly, to a liquid crystal display device operating in a vertical (homeotropic) alignment mode.

2. Description of the Related Art

Because a liquid crystal display device has low power consumption and can be made compact, it is widely used in various portable information processing devices, such as a laptop computer, or a cellular phone. On the other hand, so far, performance of the liquid crystal display device has been improved significantly, and the latest liquid crystal display devices have such high response speed and contrast ratio that they can be used in a desktop computer or a workstation to replace conventional CRT (Cathode Ray Tube) display.

In the related art, usually, a TN (Twisted Nematic) type liquid crystal operating in a normally-white mode is used in practical liquid crystal display devices. In such a TN mode liquid crystal display device, the direction of alignment of the liquid crystal molecules in the plane of a liquid crystal layer changes in response to a driving voltage signal applied on the liquid crystal layer, and by controlling changes of the direction of alignment of the liquid crystal molecules, the transmission light is switched on or switched off.

This TN mode liquid crystal display device, however, is limited in a contrast ratio. This limitation can be attributed to the operation principle of the TN mode liquid crystal display device. In addition, it is difficult for the TN mode liquid crystal display device to provide a wide viewing angle, which is required by, for example, a desktop display.

Inventors of the present inventions have proposed a so-called vertical-alignment liquid crystal display device, that is, a liquid crystal display device in which the liquid crystal molecules are aligned along a direction substantially perpendicular to the liquid crystal layer when a driving voltage signal is not applied (that is, an un-driven state).

FIG. 1A and FIG. 1B are schematic perspective views illustrating operation principle of the vertical-alignment liquid crystal display device 10 (also referred to as a MVA (multi-domain vertical alignment) liquid crystal display device), proposed by the inventors of the present invention. Specifically, FIG. 1A shows the liquid crystal display device 10 in the un-driven state, that is, the driving voltage is not applied to the liquid crystal display device 10, and FIG. 1B shows the liquid crystal display device 10 in a driven state, that is, the driving voltage is applied to the liquid crystal display device 10.

As illustrated in FIG. 1A, a liquid crystal layer 12 is interposed between a glass substrate 11A and a glass substrate 11B. The glass substrates 11A, 11B, and the liquid crystal layer 12 constitute a liquid crystal panel.

Although not illustrated, molecule alignment films are arranged on the glass substrate 11A and glass substrate 11B, respectively. Because of the molecule alignment films, the liquid crystal molecules in the liquid crystal layer 12 are aligned along a direction substantially perpendicular to the liquid crystal layer 12 when the driving voltage signal is not applied (that is, the un-driven state). In this state, a polarization plane of a light beam incident to the liquid crystal device essentially does not rotate in the liquid crystal layer 12. Therefore, in the un-driven state shown in FIG. 1A, if a polarizer and an analyzer are arranged above and below the liquid crystal panel in a crossed-Nicol configuration, the light beam passing through the polarizer and incident on the liquid crystal layer 12 is blocked by the analyzer.

On the other hand, in the driven state shown in FIG. 1B, the liquid crystal molecules are tilted due to the applied electrical field, and the polarization plane of the light beam incident to the liquid crystal layer 12 rotates in the liquid crystal layer 12. Thus, the light beam passing through the polarizer and incident on the liquid crystal layer 12 is allowed to pass through the analyzer.

In the liquid crystal display device 10, during a transition from the un-driven state to the driven state, in order to regulate the tilting direction of the liquid crystal molecules so as to improve the response speed of the liquid crystal panel, projecting patterns 13A, 13B are arranged in parallel to each other on the glass substrate 11A and the glass substrate 11B. By providing the projecting patterns 13A, 13B, the response speed of the liquid crystal device 10 is increased, at the same time, different domains involve different tilting directions of the liquid crystal molecules in the liquid crystal layer, as a result, the viewing angle of the liquid crystal device 10 is widened.

FIG. 2A and FIG. 2B are schematic views illustrating operation principle of a vertical alignment liquid crystal display device 20 of the related art, which is proposed by the inventors of the present invention.

In Japanese Laid Open Patent Application No. 2002-107730, the inventors of the present invention proposed a vertical alignment liquid crystal display device 20, as illustrated in FIG. 2A and FIG. 2B, in which stripe patterns 24 are arranged in parallel to each other, and the stripe patterns 24 form a periodically varying electrical field in the liquid crystal layer 22, and due to the electrical field, liquid crystal molecules 22A are pre-tilted along the direction in which the stripe patterns 24 extend.

In addition, in Japanese Laid Open Patent Application No. 2002-107730, the inventors of the present invention also proposed a vertical alignment liquid crystal display device 40, which corresponds to a combination of the above vertical alignment liquid crystal display device 10 and the vertical alignment liquid crystal display device 20.

As illustrated in FIG. 2A, basically, the liquid crystal display device 20 includes a glass substrate 21A and a glass substrate 21B with a liquid crystal layer 22 being interposed in between. Electrode layers 23A and 23B are provided on the glass substrates 21A and 21B, respectively.

In addition, fine structure patterns 24 are provided on the surface of the electrode layer 23A to modify the pattern of the electrical field generated between the electrode layers 23A and 23B. On the glass substrate 21A, a molecule alignment film 25MA is formed on the surface of the electrode layer 23A to cover the fine structure patterns 24. On the glass substrate 21B, a molecule alignment film 25MB is formed to cover the electrode layer 23B.

The molecule alignment films 25MA, 25MB are in contact with the liquid crystal layer 22, and the liquid crystal molecules 22A in the liquid crystal layer 22 are aligned along a direction substantially perpendicular to the liquid crystal layer 22 when the electrical field is not applied between the electrode layer 23A and the electrode layer 23B (that is, the un-driven state).

A polarization film 26A, which has a first optical absorption axis and acts as a polarizer, is provided on a lower main surface of the glass substrate 21A, while a polarization film 26B, which has a second optical absorption axis perpendicular to the first optical absorption axis and acts as another polarizer, is provided on an upper main surface of the glass substrate 21B.

In the example illustrated in FIG. 2A, the fine structure patterns 24 are conductive or insulating fine projecting patterns arranged in parallel to each other on the electrode layer 23A, but the fine structure patterns 24 may also have other configurations as long as it is able to locally modify the electrical field in the liquid crystal layer 22.

FIG. 3 is a schematic view illustrating operation principle of another example of the vertical alignment liquid crystal display device 20 of the related art.

As illustrated in FIG. 3, the fine structure patterns 24 may also be fine depressed patterns such as plural cutouts in parallel to each other in the electrode layer 23A. In FIG. 3, the same reference numbers are used for the same elements as in FIG. 2A and FIG. 2B, and overlapping descriptions are omitted.

If the fine structure patterns 24 include projecting patterns on the electrode layer 23A, as illustrated in FIG. 2A, preferably, the fine structure patterns 24 are formed from a transparent material so that a light beam incident into the liquid crystal display device can pass through the fine structure patterns 24.

Return to FIG. 2B, FIG. 2B shows the driven state of the liquid crystal display device 20, that is, the driving voltage is applied between the electrode layers 23A and 23B to change the direction of alignment of the liquid crystal molecules 22A on the glass substrate 21A.

As illustrated in FIG. 2B, in the driven state of the liquid crystal display device 20, because of the effect of the electrical field locally modified by the fine structure patterns 24, the liquid crystal molecules 22A are aligned to be tilted toward the extending directions of the fine structure patterns 24.

In the liquid crystal display device 20, when the driving voltage is applied between the electrode layers 23A and 23B, and the driving electrical field is formed in the liquid crystal molecule layer 22, because each liquid crystal molecule 22A is tilted toward the extending directions of the fine structure patterns 24 in response to the electrical field modified by the fine structure patterns 24, the response speed of the liquid crystal display device 20 is greatly improved compared with the liquid crystal display device 10 shown in FIG. 1A and FIG. 1B, because in the liquid crystal display device 10 shown in FIG. 1A and FIG. 1B, the tilt of the liquid crystal molecules has to propagate from regions near the projecting patterns 13A, 13B to other regions, but in the liquid crystal display device 20 in FIG. 2B, this is not necessary.

In addition to the above advantages, from FIG. 2B, it is found that in the liquid crystal display device 20, the alignment directions of the liquid crystal molecules 22A are essentially restricted to the extending directions of the fine structure patterns 24 in the driving state, therefore, the twisted angle of each liquid crystal molecule 22A does not change even when interactions between the tilted liquid crystal molecules 22A are present, and this results in display of high contrast ratio and high quality.

When the driving voltage is applied between the electrode layers 23A and 23B, the fine structure patterns 24 form electrical field in the liquid crystal layer 22, which is uniform in a first direction along the extending directions of the fine structure patterns 24, and varies periodically in a second direction perpendicular to the first direction.

FIG. 4 is a plan view of the substrate 21A in FIG. 3, illustrating an example of a configuration of a liquid crystal display device of the related art. In FIG. 4, the same reference numbers are used for the same elements as those shown in FIG. 3.

As illustrated in FIG. 4, on the substrate 21A, a thin film transistor (TFT) 21T is formed at the cross point between a scanning electrode 22S and a data electrode 22D which are formed below the pixel electrode 23A, and the pixel electrode 23A is connected with the TFT 21T. The substrate 21A is also referred to as a TFT substrate.

On the pixel electrode 23A, the fine structure patterns 24 are patterned to be in parallel at intervals 24G. On the pixel electrode 23A, large gaps 25A, which corresponds to the structure 13A in FIG. 1A and FIG. 1B, are patterned in a zigzag manner. Due to this, a pixel region in FIG. 4 is divided into an upper domain region and a lower domain region, and the tilting directions of the crystal liquid molecules in the upper domain region and the lower domain region are perpendicular to each other.

In FIG. 4, resist film structures 25B are formed in a zigzag manner on the substrate 21B facing the substrate 21A. The structures 25B are in correspondence to the projecting structure 13B in FIG. 1A and FIG. 1B.

In the configuration shown in FIG. 4, because of the fine structure patterns 24 and the gaps 24G between the stripe patterns 24, the tilting directions of the liquid crystal molecules are essentially regulated to be along the extending directions of the gaps 24G. Further, the pre-tilt angles are defined by the structures 25A and 25B. Hence, this configuration exhibits a high response speed.

In the configuration shown in FIG. 4, between the upper domain region and the lower domain region, auxiliary capacitance Cs is produced by the electrode pattern 23C.

Listed below are references which disclose techniques related to the present invention:

Japanese Laid-Open Patent Application No. 2002-107730,
Japanese Laid-Open Patent Application No. 2002-287158,
Japanese Laid-Open Patent Application No. 2000-305086, and
Japanese Patent Gazette No. 3456896.

FIG. 5 is a plan view of another example of the TFT substrate 21A of a liquid crystal display device of the related art, having the configuration shown in FIG. 4. In FIG. 5, the same reference numbers are used for the same elements as those shown in FIG. 3 and FIG. 4.

As illustrated in FIG. 5, plural configurations as shown in FIG. 4 are arranged in correspondence to red (R), green (G), and blue (B) colors, respectively, and on the TFT substrate 21B facing the TFT substrate 21A, a color filter is arranged in correspondence to the configuration on the TFT substrate 21A as shown in FIG. 5.

The structures 25B, one of which is indicated by "BB" in FIG. 5, are arranged to pass through corners of the pixel electrodes 23A on which the fine structure patterns 24 are formed. The structures 25A, that is, the cutouts formed in the pixel electrodes 23A, as indicated by "AA" in FIG. 5, bend at edges of the pixel electrodes 23A.

FIG. 6A and FIG. 6B are diagrams illustrating relation between the structures 25A, 25B and alignment of the liquid crystal molecules 22A in the liquid crystal display device shown in FIG. 5, especially, the liquid crystal molecules 22A at an edge of the pixel electrode 23A.

The structure 25A and 25B have the function of inducing pre-tilt of the liquid crystal molecules 22A, as described above. However, at the edge of the pixel electrode 23A, because of interaction between the effect of the edge of the pixel electrode 23A and the effect of the structure 25A and 25B, alignment of the liquid crystal molecules 22A is disordered.

Nevertheless, when the bending point of the structure 25A is at the edge of the pixel electrode 23A, as shown in FIG. 6A, or when the structure 25B passes through the corner of the pixel electrode 23A, as shown in FIG. 6B, the effect of the structure 25A or 25B of constraining alignment of the liquid crystal molecules 22A is substantially in agreement with the effect of the edge of the pixel electrode 23A of constraining alignment of the liquid crystal molecules 22A, and in such regions, that is, near the edge or corner of the pixel electrode 23A, alignment of the liquid crystal molecules 22A is not disordered.

FIG. 7A and FIG. 7B, continuing from FIGS. 6A and 6B, are diagrams illustrating relation between the structure 25A, 25B and alignment of the liquid crystal molecules 22A in the liquid crystal display device shown in FIG. 5, especially, the liquid crystal molecules 22A at an edge of the pixel electrode 23A.

When the bending point of the structure 25A is not at the edge of the pixel electrode 23A, as shown in FIG. 7A, or when the structure 25B does not pass through the corner of the pixel electrode 23A, as shown in FIG. 7B, the effect of the structure 25A or 25B of constraining alignment of the liquid crystal molecules 22A is not in agreement with the effect of the edge of the pixel electrode 23A of constraining alignment of the liquid crystal molecules 22A, and as a result, alignment of the liquid crystal molecules 22A is greatly disordered, and this results in a black spot as shown in FIG. 7A and FIG. 7B.

In this way, it is ideal if the arrangement shown in FIG. 6A and FIG. 6B is formed. In practice, however, pitches of the structures 25A and 25B are defined according to the response speed and transmission of the liquid crystal display device, and it is difficult to realize the ideal arrangement of the structures 25A and 25B in a practical liquid crystal display device.

In a liquid crystal display device of the related art, spacers, such as silica beads having specified diameters are used in order to maintain the thickness of the liquid crystal layer, that is, the thickness of the liquid crystal cell, to be a preset value.

On the other hand, recently, a structure of a liquid crystal panel is proposed which does not involve a step of distributing such spacers can be omitted when being fabricated, and this eliminates the problem of non-uniform display caused by non-uniform distribution density of the spacers.

For example, Japanese Laid Open Patent Application No. 11-242211 discloses a columnar spacer extending between a first substrate and a second substrate. Such a columnar spacer may be formed by first depositing a resist film or a polyimide film on either the first substrate or the second substrate, and then patterning the resist film or the polyimide film to a predetermined thickness, thereby, obtaining the columnar spacer of a desired shape at a desired position.

Similar to the projecting patterns 13A, 13B in FIG. 1A and FIG. 1B, such a spacer formed from an organic film has the function of constraining the alignment of the liquid crystal molecules in the liquid crystal layer. Because of the alignment constraining function of such a columnar spacer, a multi-domain structure is proposed in, for example, Japanese Laid Open Patent Application No. 2002-287158, in which the above columnar spacer is arranged at the center of a pixel electrode, and each pixel is divided into multiple sector-shaped domains with the columnar spacer as a center.

On the other hand, because the liquid crystal layer cannot be distributed in a region where the columnar spacer is arranged, such a region cannot be used for display. Hence, it is preferable that the columnar spacer be arranged not in the pixel region. For example, in the above mentioned Japanese Laid Open Patent Application No. 11-242211, plural columnar spacers are arranged symmetrically around a pixel region, and a symmetric domain structure as desired is formed in the pixel region.

When the columnar spacer is arranged in a liquid crystal display device having TFT substrates as illustrated in FIG. 4 or FIG. 5, because the columnar spacer has the function of constraining the alignment of the liquid crystal molecules, the same problems as explained with reference to FIG. 7A and FIG. 7B may occur.

FIG. 8 is a plan view illustrating an example of a configuration of a liquid crystal display device 30A of the related art, which is obtained by providing a columnar spacer P in the liquid crystal display device 30 having the TFT substrate 21A. In FIG. 8, the same reference numbers are used for the same elements as those shown in FIG. 4.

As illustrated in FIG. 8, the columnar spacer P is formed on an electrode pattern 23C across a center portion of the pixel electrode 21A corresponding to the structure 25A, in other words, the columnar spacer P is formed out of the visible region of the liquid crystal display device 30A. However, as illustrated in FIG. 8, while it is desired that the direction of alignment of the liquid crystal molecules 22A be parallel to the extending direction of the fine structure 24, because of presence of the columnar spacer P, in practice, the alignment direction of the liquid crystal molecules 22A near the spacer P turns out to be roughly perpendicular to the extending direction of the stripe patterns of the fine structure 24.

In this situation, even though the columnar spacer P is formed out of the visible region of the liquid crystal display device 30A, it causes a dark portion on a display region and can be recognized by viewers. Furthermore, in the structure shown in FIG. 8, the columnar spacer P causes an additional disorder of the alignment of the liquid crystal molecules 22A besides the disorder of the alignment of the liquid crystal molecules 22A as explained in FIG. 7A and FIG. 7B.

SUMMARY OF THE INVENTION

It is a general object of the present invention to solve one or more of the problems of the related art.

It is a more specific object of the present invention to provide a liquid crystal display device capable of suppressing disorder of alignment of liquid crystal molecules caused by a spacer arranged between two substrates.

According to a first aspect of the present invention, there is provided a liquid crystal display device, comprising a first substrate; a second substrate facing the first substrate; a liquid crystal layer formed from liquid crystal molecules and held between the first substrate and the second substrate, said liquid crystal molecules being aligned to be substantially perpendicular to the first substrate and the second substrate in an un-driven state, and being aligned to be along a first direction in a plane substantially parallel to the first substrate and the second substrate in a driven state, said un-driven state corresponding to a state in which a driving electrical field is not applied on the liquid crystal layer, said driven state corresponding to a state in which the driving electrical field is applied on the liquid crystal layer; a plurality of pixel regions formed in the liquid crystal layer; a patterned structure that is provided on at least one of the first substrate and the second substrate, extends along a second direction perpendicular to the first direction, and is capable of aligning the liquid crystal molecules to be along the first direction in the driven state, said patterned structure including at least one of a first alignment control pattern formed on the first substrate and extending along the second direction and a second alignment control pattern formed on the second substrate and extending along the second direction; and a spacer that is arranged between the first substrate and the second substrate to maintain a gap between the first substrate and the second substrate to be a constant, said spacer being arranged to cover at least a portion of one of the pixel regions, said spacer being capable of aligning the liquid crystal molecules near the spacer to be substantially along the first direction.

According to the present invention, in a vertical alignment mode liquid crystal display device wherein liquid crystal molecules are aligned to be along the first direction due to the first alignment control pattern and the second alignment control pattern formed on the first substrate and the second substrate, respectively, because the spacer arranged between the first substrate and the second substrate is capable of aligning the liquid crystal molecules near the spacer to be substantially along the first direction, disorder of alignment of the liquid crystal molecules near the spacer is suppressed, further, even when the layout of the first alignment control pattern and the second alignment control pattern is not ideal, it is possible to reduce disorder of alignment of the liquid crystal molecules and improve transmittance of the liquid crystal display device.

According to a second aspect of the present invention, there is provided a liquid crystal display device, comprising a first substrate; a second substrate facing the first substrate; a liquid crystal layer formed from liquid crystal molecules and held between the first substrate and the second substrate, said liquid crystal molecules being aligned to be substantially perpendicular to the first substrate and the second substrate in an un-driven state, and being aligned to be along a first direction in a plane substantially parallel to the first substrate and the second substrate in a driven state, said un-driven state corresponding to a state in which a driving electrical field is not applied on the liquid crystal layer, said driven state corresponding to a state in which the driving electrical field is applied on the liquid crystal layer; a plurality of pixel regions formed in the liquid crystal layer; a patterned structure that is provided on at least one of the first substrate and the second substrate, extends along a second direction perpendicular to the first direction, and is capable of aligning the liquid crystal molecules to be along the first direction in the driven state, said patterned structure including at least one of a first alignment control pattern formed on the first substrate and extending along the second direction and a second alignment control pattern formed on the second substrate and extending along the second direction; and a spacer that is arranged between the first substrate and the second substrate to maintain a gap between the first substrate and the second substrate to be a constant, said spacer being arranged to cover at least a portion of one of the pixel regions, said spacer being enclosed on three sides by the second alignment control pattern.

According to the present invention, in a vertical alignment mode liquid crystal display device wherein liquid crystal molecules are aligned to be along the first direction due to the first alignment control pattern and the second alignment control pattern formed on the first substrate and the second substrate, respectively, because the spacer arranged between the first substrate and the second substrate is enclosed on three sides by the second alignment control pattern, capability of the second alignment control pattern of controlling alignment of the liquid crystal molecules is improved near the spacer, and this helps suppress disorder of alignment of the liquid crystal molecules caused by the spacer.

According to a third aspect of the present invention, there is provided a liquid crystal display device, comprising a first substrate; a second substrate facing the first substrate; a liquid crystal layer formed from liquid crystal molecules and held between the first substrate and the second substrate, said liquid crystal molecules being aligned to be substantially perpendicular to the first substrate and the second substrate in an un-driven state, and being aligned to be along a first direction in a plane substantially parallel to the first substrate and the second substrate in a driven state, said un-driven state corresponding to a state in which a driving electrical field is not applied on the liquid crystal layer, said driven state corresponding to a state in which the driving electrical field is applied on the liquid crystal layer; a plurality of pixel regions formed in the liquid crystal layer; a patterned structure that is provided on at least one of the first substrate and the second substrate, extends along a second direction perpendicular to the first direction, and is capable of aligning the liquid crystal molecules to be along the first direction in the driven state, said patterned structure including at least one of a first alignment control pattern formed on the first substrate and extending along the second direction and a second alignment control pattern formed on the second substrate and extending along the second direction; and a spacer that is arranged between the first substrate and the second substrate to maintain a gap between the first substrate and the second substrate to be a constant, said spacer being arranged to cover at least a portion of one of the pixel regions, said spacer being arranged out of the pixel regions and being separated by a distance such that the spacer does not change alignment of the liquid crystal molecules in the pixel regions.

According to the present invention, in a vertical alignment mode liquid crystal display device wherein liquid crystal molecules are aligned to be along the first direction due to the first alignment control pattern and the second alignment control pattern formed on the first substrate and the second substrate, respectively, because the spacer is arranged out of the pixel regions and separated by a distance so that the spacer does not change alignment of the liquid crystal molecules in the pixel regions, disorder of alignment of the liquid crystal molecules caused by the spacer is suppressed.

These and other objects, features, and advantages of the present invention will become more apparent from the following detailed description of the preferred embodiments given with reference to the accompanying drawings.

BRIEF DESCRIPTION OF THE DRAWINGS

FIG. 1A and FIG. 1B are schematic perspective views illustrating operation principle of an example of a vertical-alignment liquid crystal display device of the related art;

DESCRIPTION OF THE PREFERRED EMBODIMENTS

Below, preferred embodiments of the present invention are explained with reference to the accompanying drawings.

First Embodiment

Figure 9:
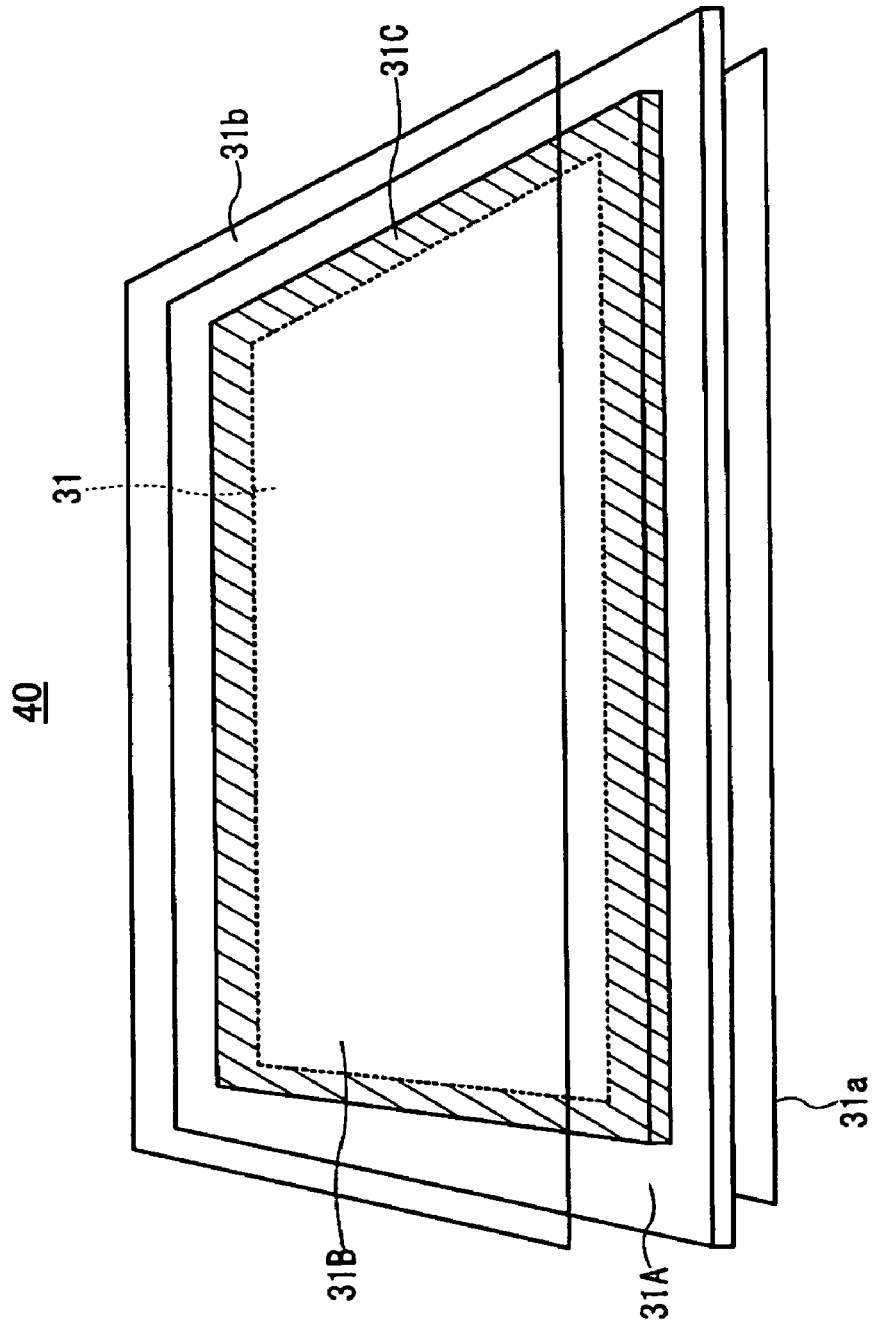
FIG. 9 is a schematic perspective view illustrating an example of a configuration of a liquid crystal display device 40 according to a first embodiment of the present invention.

FIG. 9 is a schematic perspective view illustrating an example of a configuration of a liquid crystal display device 40 according to a first embodiment of the present invention.

Figure 10A:
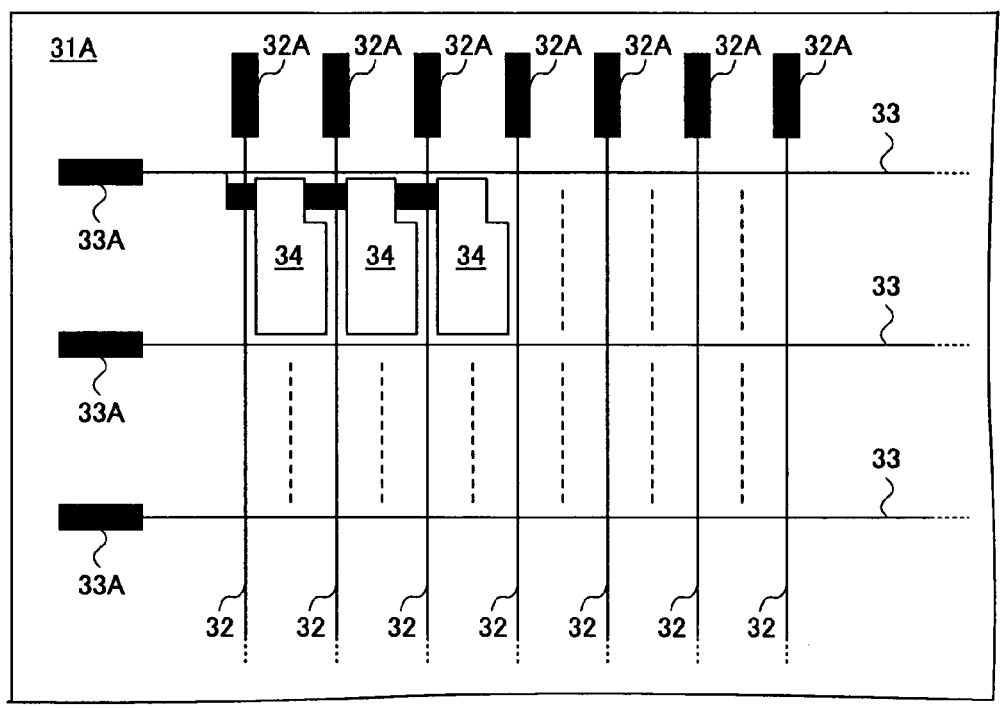
FIG. 10A is an enlarged view of a portion of the liquid crystal display device 40 in FIG. 9.

FIG. 10A is an enlarged view of a portion of the liquid crystal display device 40 in FIG. 9.

Figure 10B:
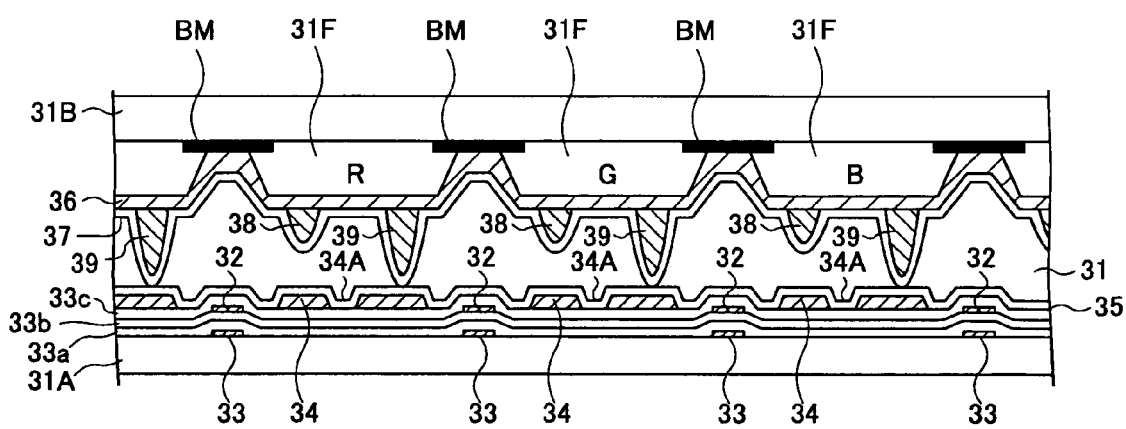
FIG. 10B is an enlarged cross-sectional view of a portion of the liquid crystal display device 40 in FIG. 9.

FIG. 10B is an enlarged cross-sectional view of a portion of the liquid crystal display device 40 in FIG. 9.

Figure 3:
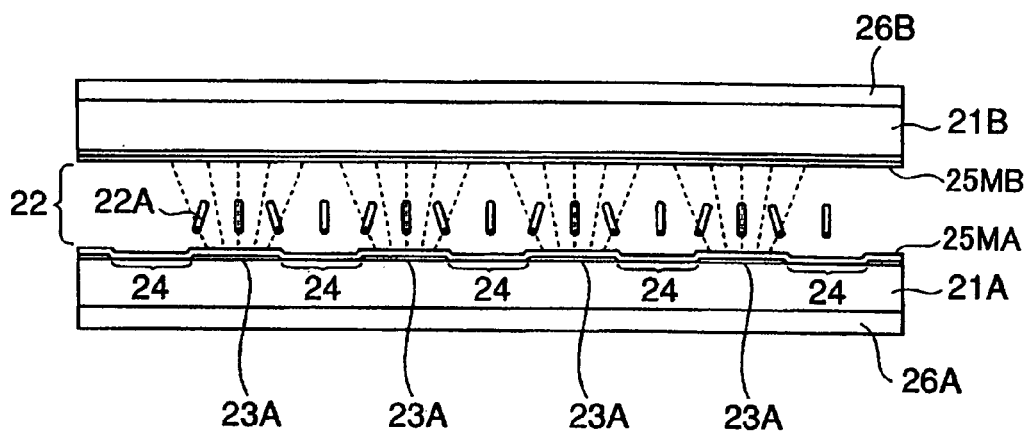
FIG. 3 is a schematic view illustrating operation principle of still another example of a vertical alignment liquid crystal display device of the related art.
Figure 4:
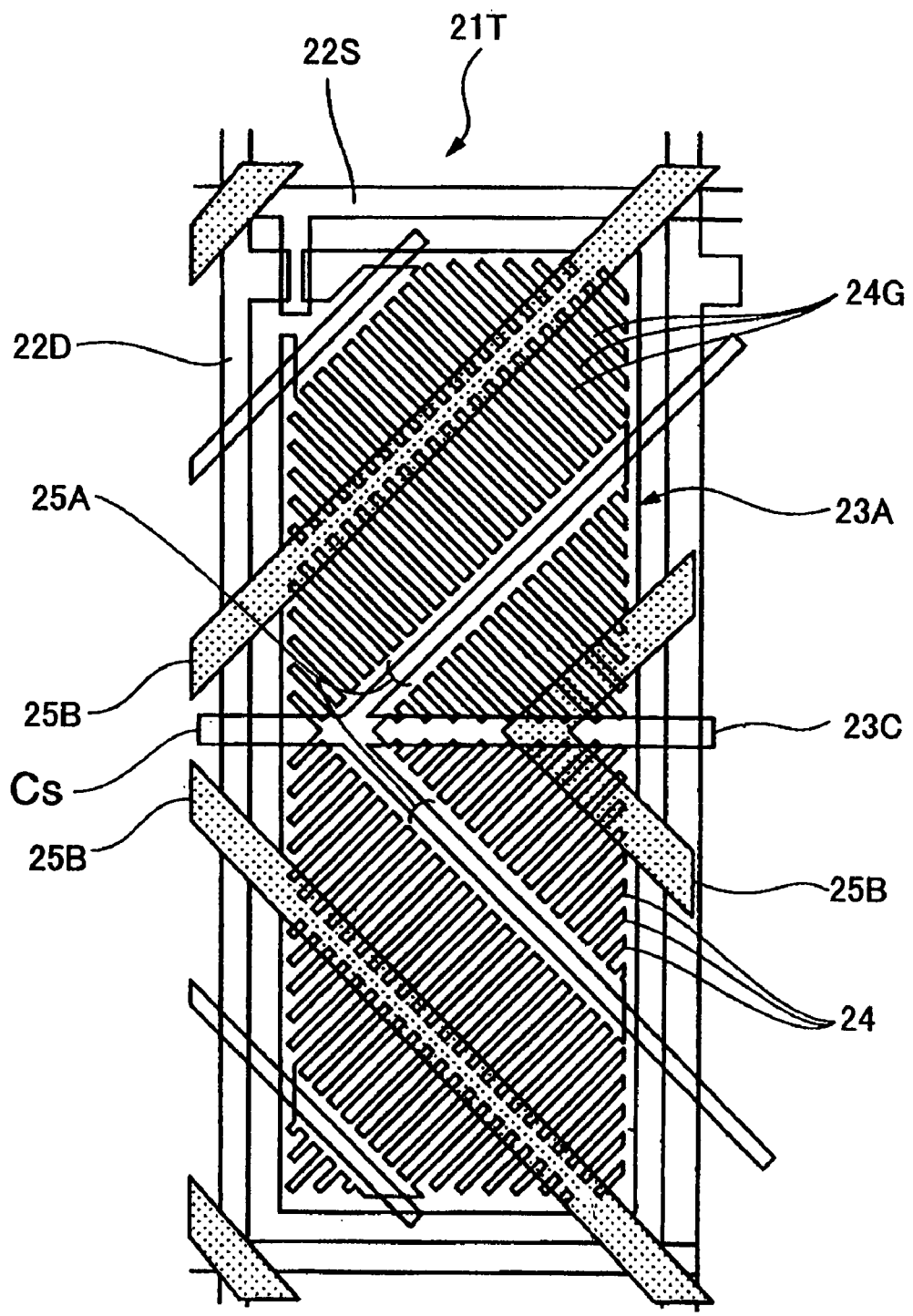
FIG. 4 is a plan view of an example of a TFT substrate in a liquid crystal display device of the related art.
Figure 5:
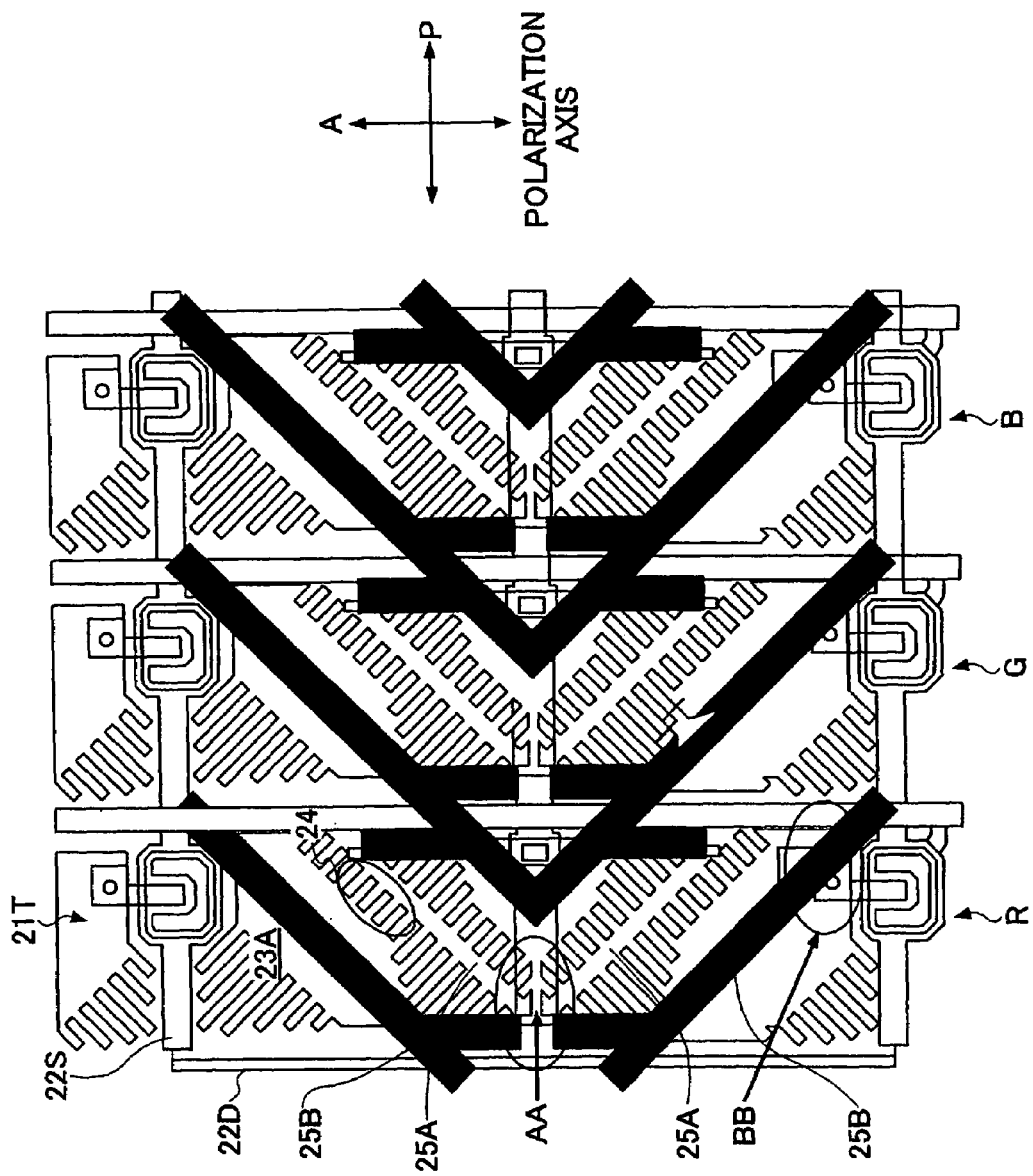
FIG. 5 is a plan view of another example of the TFT substrate in a liquid crystal display device of the related art.
Figure 6A:
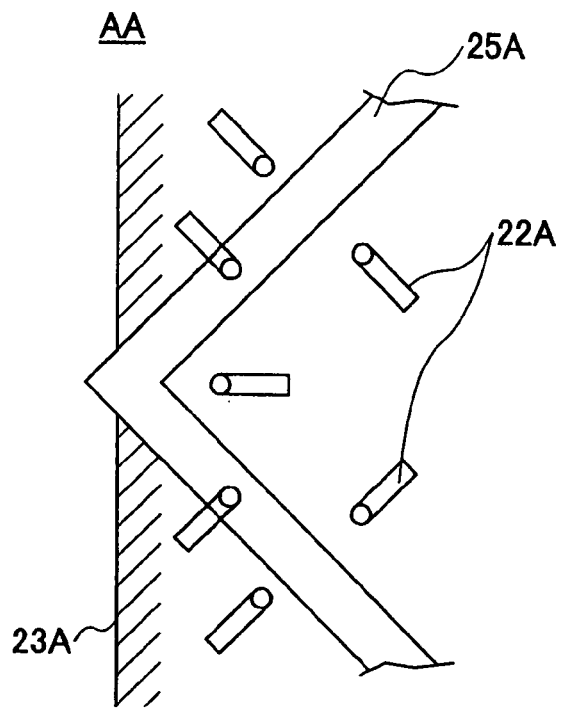
FIG. 6A and FIG. 6B are diagrams illustrating relation between the TFT structures and alignment of liquid crystal molecules in the liquid crystal display device.
Figure 6B:
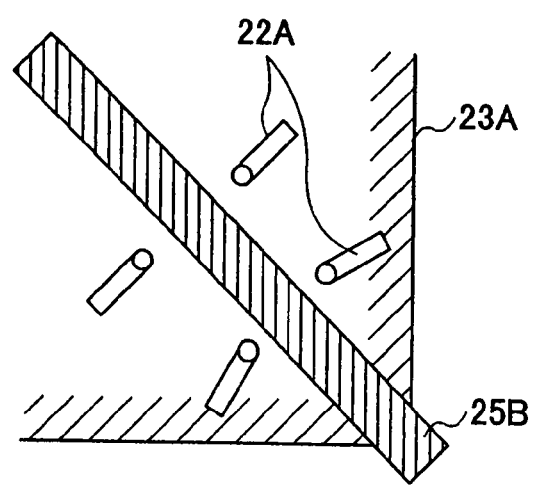
Figure 7A:
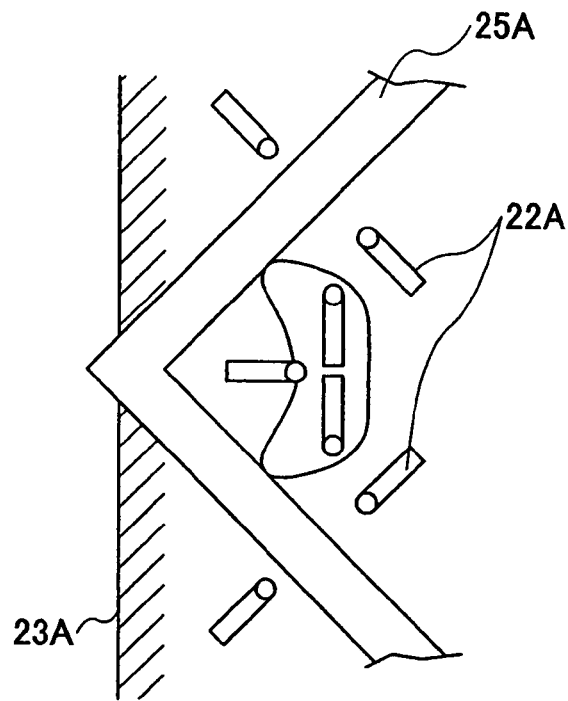
FIG. 7A and FIG. 7B, continuing from FIGS. 6A and 6B, are diagrams illustrating relation between the TFT structure and alignment of the liquid crystal molecules in the liquid crystal display device.
Figure 7B:
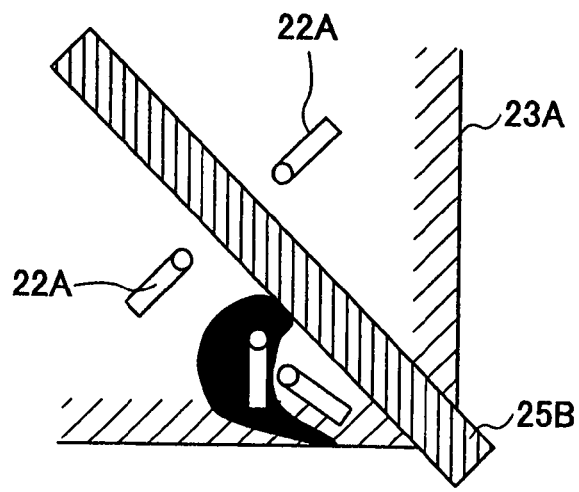

As illustrated in FIG. 9, the liquid crystal display device 40 is an active-matrix liquid crystal display device, including a TFT glass substrate 31A and a TFT glass substrate 31B facing the TFT glass substrate 31A. The TFT glass substrate 31A carries plural thin film transistors (TFT) and a transparent pixel electrode cooperative with the TFTs, which corresponds to the electrode layer 23A as illustrated in FIG. 3 and FIG. 4.

The TFT glass substrate 31B carries an electrode formed on the TFT glass substrate 31A, which corresponds to the electrode layer 23B. A liquid crystal layer 31 interposed between the substrate 31A and the substrate 31B is sealed by a sealing member 31C.

In the liquid crystal display device 40 illustrated in FIG. 9, FIG. 10A and FIG. 10B, by selectively driving the transparent pixel electrode through a corresponding TFT, in a portion of the liquid crystal layer 31 corresponding to the selected pixel electrode, alignment of the liquid crystal molecules is selectively changed. A polarizer 31a and an analyzer 31b are arranged outside the glass substrate 31A and the glass substrate 31B in a crossed-Nicol configuration. Although not illustrated, molecule alignment films are arranged on respective inner sides of the glass substrate 31A and the glass substrate 31B in contact with the liquid crystal layer 31. These molecule alignment films correspond to the molecule alignment films 25MA and 25MB in FIG. 4, and have functions of restricting the direction of alignment of the liquid crystal molecules in the liquid crystal layer 31 to be substantially perpendicular to the plane containing the liquid crystal layer 31 when an electrical field is not applied between the electrode layer 23A and the electrode layer 23B (that is, an un-driven state).

As illustrated in FIG. 10A, in the liquid crystal display device 40, there are arranged plural pad electrodes 33A which supply scanning signals to the glass substrate 31A, plural scanning electrodes 33 arranged subsequent to the pad electrodes 33A, respectively, plural pad electrodes 32A which receive video signals, and plural signal electrodes 32 arranged subsequent to the pad electrodes 32A, respectively. The extending direction of the scanning electrodes 33 is substantially perpendicular to the extending direction of the signal electrodes 32. As shown in FIG. 10A, thin film transistors (TFT) 31T are arranged at cross points between the scanning electrode 33 and the signal electrodes 32.

On the glass substrate 31A, transparent pixel electrodes 34, formed from ITO or the like, are arranged in correspondence to the TFTs 31T. One of the pixel electrodes 34 is selected by the scanning signal from one of the scanning electrodes 33 related to the TFT 31T corresponding to the one of the pixel electrodes 34, and the video signal from the corresponding signal electrode 32 drives the selected ITO pixel electrode 34 to operate.

The liquid crystal layer 31 may be made by using a liquid crystal having a negative anisotropy of the dielectric constant provided by Merck Ltd. The aforesaid molecule alignment film may be made by using a vertical alignment film provided by JSR Corp. Typically, a spacer as illustrated in FIG. 10B is used to assembly the glass substrate 31A and the glass substrate 31B so that the thickness of the liquid crystal layer 31 is maintained to be about 4 µm.

In the liquid crystal display device 40, in the un-driven state, that is, when the driving voltage is not applied to the transparent pixel electrodes 34, the liquid crystal molecules are aligned to be substantially perpendicular to the plane of the liquid crystal layer 31, and due to the polarizer 31a and the analyzer 31b, the liquid crystal display device 40 is in black display state. In the driven state, that is, when the driving voltage is applied to the transparent pixel electrodes 34, the liquid crystal molecules are aligned to be substantially parallel to the liquid crystal layer 31, the liquid crystal display device 40 is in white display state.

As illustrated in FIG. 10B, the scanning electrodes 33, which also act as gate electrodes of the TFTs 31T, extend on the glass substrate 31A, and a gate insulating film 33a is deposited on the glass substrate 31A to cover the scanning electrodes 33. Also not illustrated, an interlayer insulating film 33b is deposited on the gate insulating film 33a to cover an amorphous silicon layer or a poly-silicon layer constituting the TFTs 31T, and the signal electrodes 32 are arranged on the interlayer insulating film 33b. Further, another interlayer insulating film 33c is deposited on the interlayer insulating film 33b to cover the signal electrodes 32. The transparent pixel electrodes 34 are formed on the interlayer insulating film 33c and are connected to the TFTs 31T through not-illustrated via holes. Moreover, a molecule alignment film corresponding to the molecule alignment film 25MA in FIG. 4 is formed on the interlayer insulating film 33c to cover the transparent pixel electrodes 34.

In the liquid crystal display device 40, cutouts 34A, which correspond to the structure 13A in FIG. 1A and FIG. 1B, are formed in a zigzag manner in a portion of the transparent pixel electrodes 34. It should be noted that the structures 13A and 13B can be replaced by depressed patterns formed in the substrate 11A or 11B.

On the other hand, on the glass substrate 31B, a black mask (BM) is formed in correspondence to the TFTs 31T, and red (R), green (G), and blue (B) color filters 31F are arranged in correspondence to the transparent pixel electrodes 34.

Figures 2A, 2B:
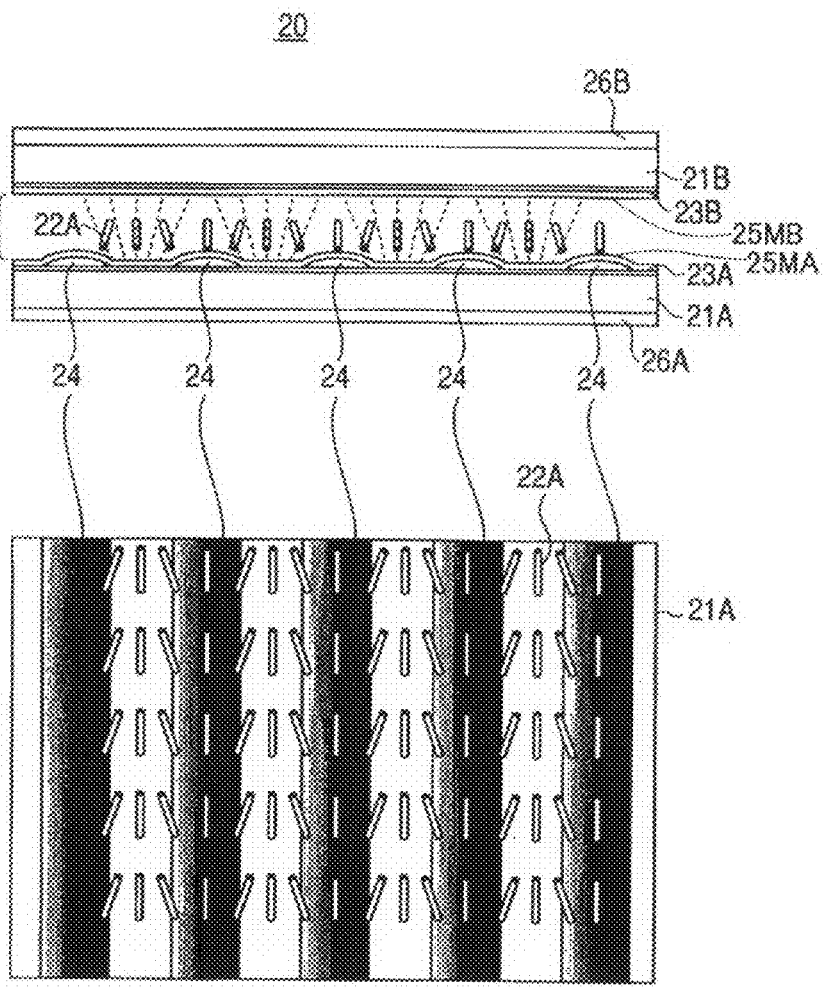
FIG. 2A and FIG. 2B are schematic views illustrating operation principle of another example of a vertical alignment liquid crystal display device of the related art.

An electrode 36, which corresponds to the electrode layer 23B in FIG. 2A, are uniformly formed on the color filters 31F, and a projecting pattern 38 and a columnar spacer 39, which correspond to the structure 25B in FIG. 4, are formed on the electrode 36 by depositing resist patterns. The projecting pattern 38 and the columnar spacer 39 are covered by molecule alignment films 37, which correspond to the molecule alignment films 25MA in FIG. 2A. Both the projecting pattern 38 and the columnar spacer 39 have smooth inclined surfaces and projecting ends.

The columnar spacer 39 is higher than the projecting pattern 38, for example, it is fabricated to have a height of four μm corresponding to the thickness of the liquid crystal cells. The end of the columnar spacer 39 is in contact with the transparent pixel electrodes 34 through the molecule alignment films 35 and 37, and thereby, defining the thickness of the liquid crystal layer 31. In order to form the projecting pattern 38 and the columnar spacer 39, for example, a resist film may be deposited on the glass substrate 31B to a desired thickness by, for example, spin coating, and after being patterned, the resist film may be heated and cured twice with different film thicknesses. In this way, the projecting pattern 38 and the columnar spacer 39 can be fabricated easily. For example, the projecting pattern 38 is formed by using a positive resist, and the aforementioned depressed pattern 39 is formed by using a negative resist.

Figure 11:
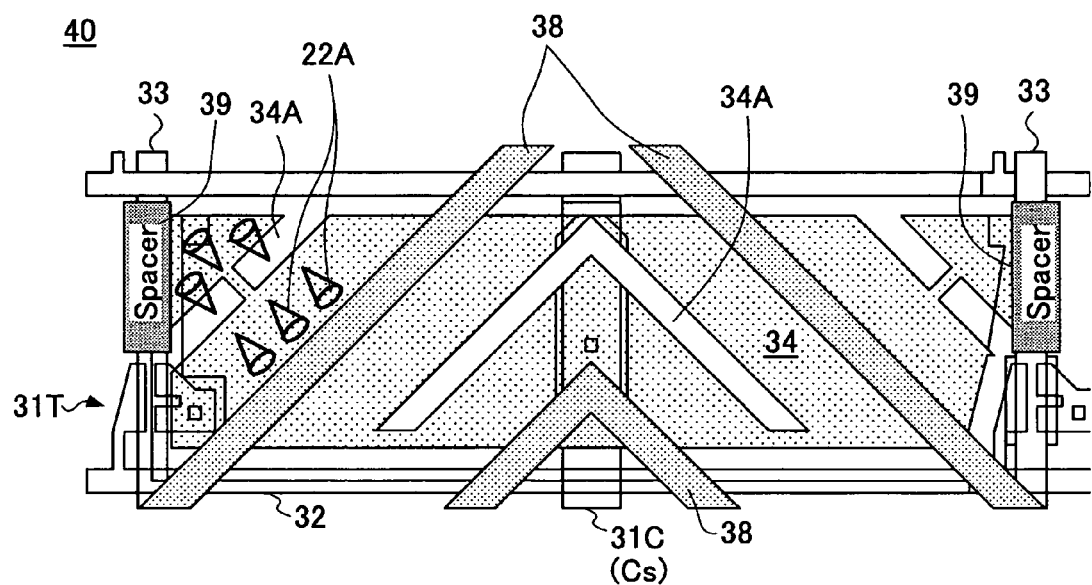
FIG. 11 is a plan view illustrating a structure of the pixel electrode 34 of the liquid crystal display device 40 according to the first embodiment of the present invention.

FIG. 11 is a plan view illustrating a structure of the pixel electrode 34 of the liquid crystal display device 40 according to the first embodiment of the present invention.

As illustrated in FIG. 11, the projecting pattern 38 and the cutouts 34A are formed to extend on the pixel electrode 34 in a zigzag manner and in parallel to each other. The pixel electrode 34 is divided into an upper domain region and a lower domain region by the electrode pattern 31C, which extends in the horizontal direction through the center portion, and produces the auxiliary capacitance Cs. The electrode pattern 31C corresponds to the electrode pattern 23C in FIG. 4. Hence, the projecting pattern 38 and the cutouts 34A extend in parallel to a certain direction (referred to as "first direction" where necessary) in both the first domain and the second domain, but the first direction in the upper domain perpendicularly intersects with the first direction in the lower domain. Therefore, the alignment of the liquid crystal molecules in the upper domain is perpendicular to the alignment of the liquid crystal molecules in the lower domain, and this reduces dependence of optical display on an azimuthal angle or a polar angle.

In the configuration shown in FIG. 11, each columnar spacer 39 partially overlaps with the upper end and lower end of the transparent pixel electrode 34 on the scanning electrodes (gate bus line) 33. Due to such a configuration, near a corner of the transparent pixel electrode 34, the liquid crystal molecules receive interactions from the edge of the transparent pixel electrode 34, the cutouts 34A, and the columnar spacer 39. However, as illustrated in FIG. 11, the columnar spacer 39 is arranged to face the projecting pattern 38 with the cutouts 34A in between, the columnar spacer 39 enhances interaction of the cutouts 34A from the back side of the cutouts 34A, the liquid crystal molecules are tilted to be substantially perpendicular to the extending direction of the cutouts 34A.

Under this condition, if the transparent pixel electrode 34 is driven through the TFT 31T, at the corner of the transparent pixel electrode 34, the liquid crystal molecules are rapidly tilted to the direction substantially perpendicular to the extending direction of the cutouts 34A. Thereby, it is possible to realize a liquid crystal display device capable of high speed display with high transmittance in the driven state.

Figure 8:
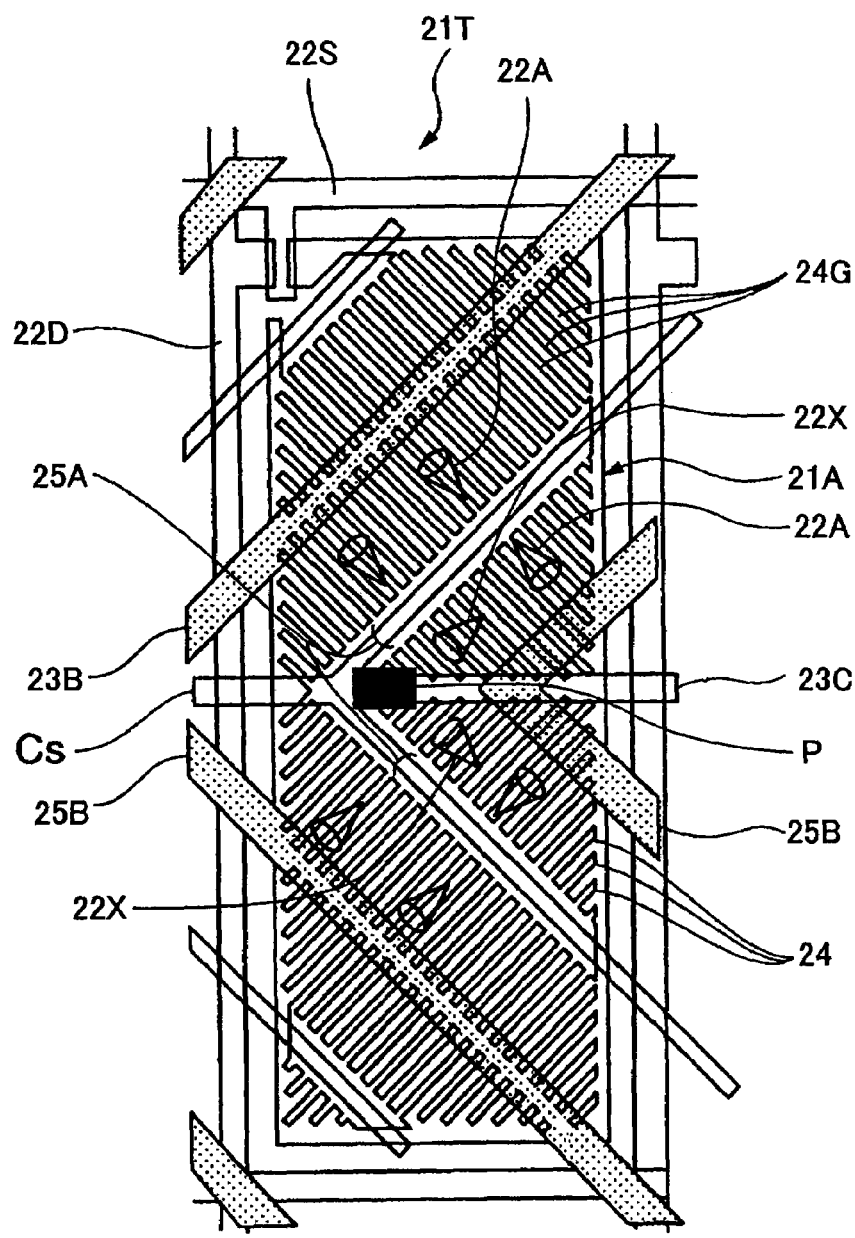
FIG. 8 is a plan view illustrating an example of a configuration of a liquid crystal display device of the related art, which is obtained by providing a columnar spacer P in the liquid crystal display device having the TFT substrate shown in FIG. 4.

According to experimental results by the present inventors, it was found that due to the configuration shown in FIG. 11, the transmittance was improved by 6% compared with the configuration shown in FIG. 8. Each pixel was investigated by using a microscope, and no abnormal domain is observed near the columnar spacer 39.

Second Embodiment

Figure 12:
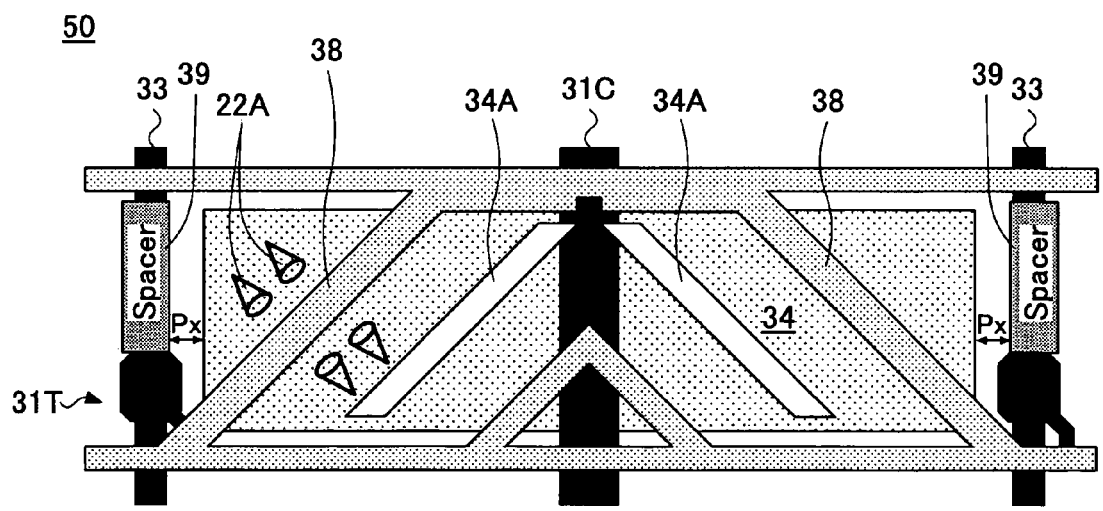
FIG. 12 is a plan view illustrating a configuration of a liquid crystal display device 50 according to a second embodiment of the present invention.

FIG. 12 is a plan view illustrating a configuration of a liquid crystal display device 50 according to a second embodiment of the present invention. In FIG. 12, the same reference numbers are used for the same elements as those described previously, and overlapping descriptions are omitted.

As illustrated in FIG. 12, the projecting pattern 38 and the cutouts 34A are formed to extend on the pixel electrode 34 in a zigzag manner and in parallel to each other. In the second embodiment, the cutout pattern 34A is formed only at the center portion of the pixel electrode 34, but not arranged outside the center portion, specifically, not arranged outside the projecting pattern 38. Due to this arrangement, the constraint on the alignment of the liquid crystal molecules 22A applied by the projecting pattern 38 is in effect even up to the outer edge of the pixel electrode 34.

In the second embodiment, similarly, the columnar spacers 39 are also formed on the scanning electrodes 33, but if the columnar spacers 39 were also arranged to partially overlap with the transparent pixel electrode 34, as in shown in FIG. 11, because there is not any cutout 34A between the columnar spacers 39 and the transparent pixel electrode 34, the columnar spacers 39 would also regulate the alignment of the liquid crystal molecules 22A, and this produces an effect in confliction with the alignment regulation effect of the projecting pattern 38, and causes disorder of the alignment of the liquid crystal molecules 22A.

In order to avoid this problem, as illustrated in FIG. 12, the columnar spacers 39 are separated from the transparent pixel electrode 34 by a distance Px.

Experimental results showed that the transmittance in the driven state was improved by about 3% compared with the configuration shown in FIG. 8 when the distance Px was set to be about 6 μm. This implies that by separating the columnar spacers 39 from the transparent pixel electrode 34 by a distance Px, for example, setting the distance Px to be about 6 μm, the alignment regulation effect of the columnar spacers 39 essentially becomes negligible.

The configuration shown in FIG. 12 is basically the same as that shown in FIG. 11 except for the features described above. In addition, in order to illustrate the columnar spacers 39 arranged outside the pixel region, the sizes of the columnar spacers 39 are reduced more or less in FIG. 12, and for this reason, the arrangement outside the projecting pattern 38 in FIG. 11 is illustrated in FIG. 12.

Third Embodiment

Figure 13:
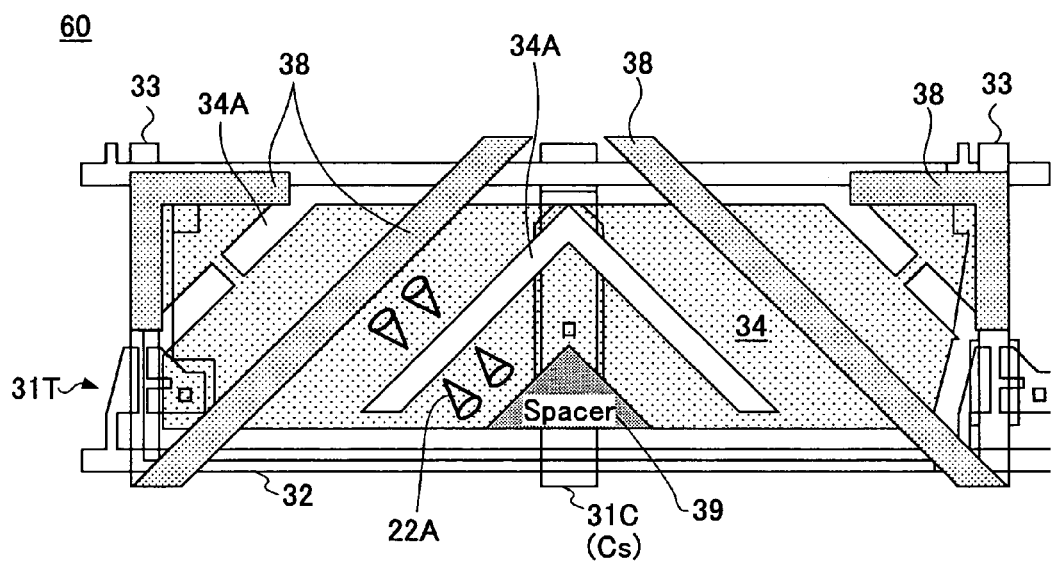
FIG. 13 is a plan view illustrating a configuration of a liquid crystal display device 60 according to a third embodiment of the present invention.

FIG. 13 is a plan view illustrating a configuration of a liquid crystal display device 60 according to a third embodiment of the present invention. In FIG. 13, the same reference numbers are used for the same elements as those described previously, and overlapping descriptions are omitted.

As illustrated in FIG. 13, in the present embodiment, in addition to the structure shown in FIG. 11 or FIG. 12, the columnar spacer 39 is arranged such that the cutout patterns 34A are formed between two projecting patterns 38 opposite to each other on the electrode pattern 31C, which produces the auxiliary capacitance Cs, and the edges of the columnar spacer 39 are in parallel to the cutout patterns 34A.

In the structure in FIG. 13, between the columnar spacer 39 and the projecting pattern 38, the columnar spacer 39, the projecting pattern 38, and the cutout patterns 34A cooperate with each other so as to regulate the alignment direction of the liquid crystal molecules to be substantially perpendicular to the extending direction of the cutouts 34A. Hence, when the driving voltage is applied to the transparent pixel electrode 34, the liquid crystal molecules are rapidly tilted to the extending direction of the transparent pixel electrode 34 and the cutouts 34A to change transmittance of pixels.

As described above, in the present embodiment, with the cutout patterns 34A in between, the columnar spacer 39 provides the same effect as the projecting pattern 38 to effectively regulate alignment of the liquid crystal molecules. In the present embodiment, it is preferable to set the distance between the edge of the columnar spacer 39 and the cutout patterns 34A to be substantially the same as the distance between the projecting pattern 38 and the cutout patterns 34A.

In the present embodiment, although the columnar spacer 39 is formed within the pixel region of the transparent pixel electrode 34, a larger portion of the columnar spacer 39 is arranged on the bus electrode 31C, and this enables a minimum reduction of the transmittance due to presence of the columnar spacer 39, while ensuring a sufficiently large area for realizing the functions of a spacer.

Fourth Embodiment

Figure 14:
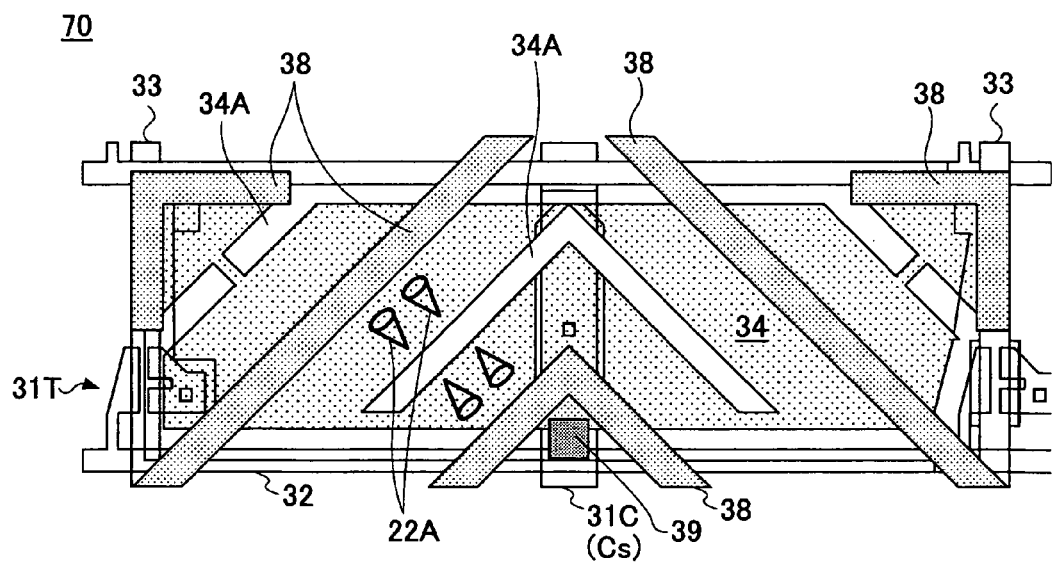
FIG. 14 is a plan view illustrating a configuration of a liquid crystal display device 60 according to a fourth embodiment of the present invention.

FIG. 14 is a plan view illustrating a configuration of a liquid crystal display device 60 according to a fourth embodiment of the present invention. In FIG. 14, the same reference numbers are used for the same elements as those in FIG. 13, and overlapping descriptions are omitted.

As illustrated in FIG. 14, in the present embodiment, similar to the structure in FIG. 11 or FIG. 12, a projecting pattern 38 is formed in a shape of "L" on the inner side of the L-shaped cutout patterns 34A, in addition, the columnar spacer 39 is arranged on the inner side of the L-shaped projecting patterns 38.

In the structure shown in FIG. 14, the alignment regulation effect of the columnar spacers 39 on the liquid crystal molecules 22A is in confliction with the alignment regulation effect of the projecting pattern 38 on the outer side, however, as illustrated in FIG. 14, the columnar spacer 39 is arranged to be enclosed on three sides by the projecting pattern 38 so as to reduce influence of the columnar spacer 39 on the liquid crystal molecules 22A.

With the structure shown in FIG. 14, an optical transmittance is obtained that is similar to that obtained by using the structure shown in FIG. 12.

Fifth Embodiment

Figure 15:
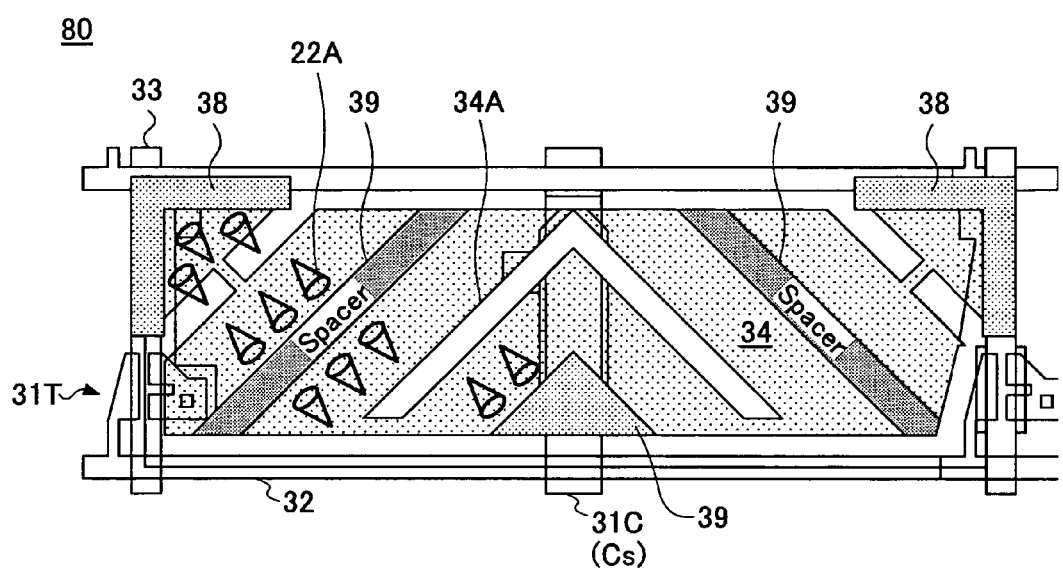
FIG. 15 is a plan view illustrating a configuration of a liquid crystal display device 80 according to a fifth embodiment of the present invention.

FIG. 15 is a plan view illustrating a configuration of a liquid crystal display device 80 according to a fifth embodiment of the present invention. In FIG. 15, the same reference numbers are used for the same elements as those described previously, and overlapping descriptions are omitted.

In the present embodiment, as illustrated in FIG. 15, in the structure shown in FIG. 13, the projecting patterns 38 are replaced by the columnar spacer 39. Hence, in the present embodiment, the columnar spacer 39 is not an isolated pattern, but a continuing pattern.

With the structure shown in FIG. 15, that is, by replacing the projecting patterns 38 with the columnar spacer 39, it is possible to realize substantially ideal alignment of the liquid crystal molecules 22A.

Sixth Embodiment

Figure 16:
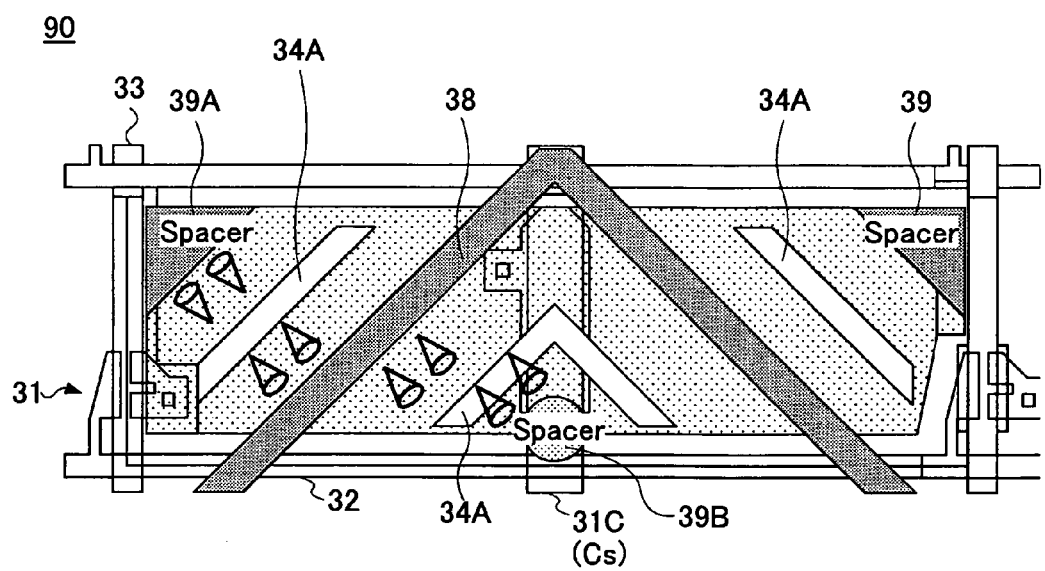
FIG. 16 is a plan view illustrating a configuration of a liquid crystal display device 90 according to a sixth embodiment of the present invention.

FIG. 16 is a plan view illustrating a configuration of a liquid crystal display device 90 according to a sixth embodiment of the present invention. In FIG. 16, the same reference numbers are used for the same elements as those described previously, and overlapping descriptions are omitted.

In the present embodiment, as illustrated in FIG. 16, the projecting patterns 38 originally arranged at corners of the pixel electrode 34 are replaced by spacer patterns 39A having edges in parallel to the extending direction of a cutout patterns 34A facing the otherwise existing projecting patterns 38. In addition, on the auxiliary capacitance bus 31C at the center portion, a spacer pattern 39B having a circular cross section is arranged on the inner side of the L-shaped cutout pattern 34A, in other words, the spacer pattern 39B is arranged to face the L-shaped projecting pattern 38 with the cutout patterns 34A in between.

In the present embodiment, by arranging the spacer patterns 39A to be at the corners of the pixel electrode 34 with the edges of the spacer patterns 39A being in parallel to the extending direction of the cutout patterns 34A facing the spacer patterns 39A, the alignment of the liquid crystal molecules 22A at the corners of the pixel electrode 34 is regulated to be perpendicular to edges of the spacer patterns 39A, and this suppress occurrence of display defects.

By arranging the spacer pattern 39B on the inner side of the L-shaped cutout pattern 34A, it is found that desired alignment of the liquid crystal molecules 22A is attained even in this region. Concerning the spacer pattern 39B, although it is thought that preferably the spacer pattern 39B may be the triangular spacer pattern as illustrated in FIG. 13, in the present embodiment illustrated in FIG. 16, the spacer pattern 39B is not limited to the triangular spacer pattern illustrated in FIG. 13.

In the present embodiment, by arranging the spacer patterns 39A to be at the corners of the pixel electrode 34, or by arranging the spacer pattern 39A to have a triangular cross section, the TFT glass substrate 31A and the TFT glass substrate 31B can be stably supported.

Seventh Embodiment

Figure 17:
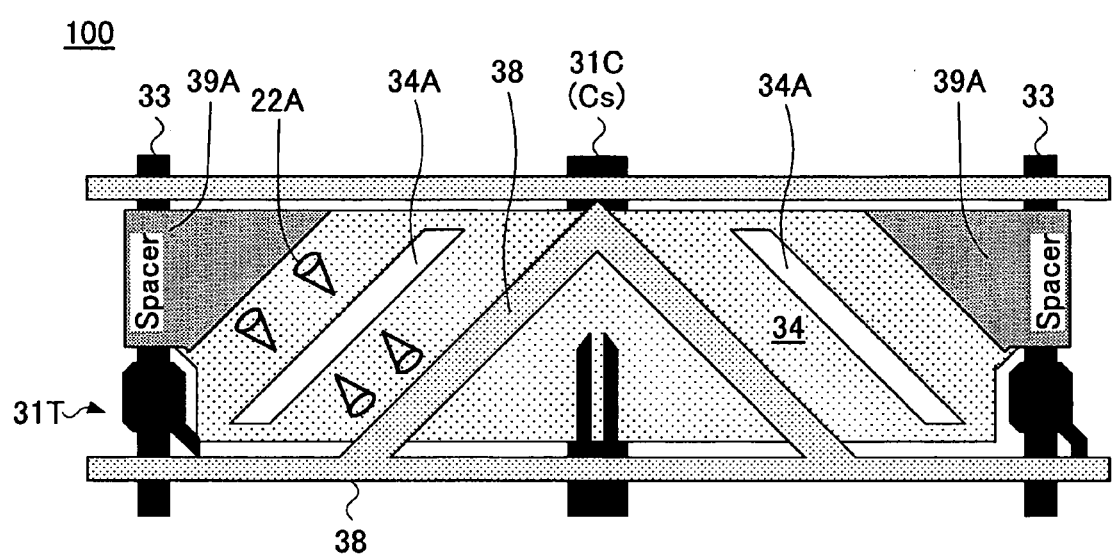
FIG. 17 is a plan view illustrating a configuration of a liquid crystal display device 100 according to a seventh embodiment of the present invention.

FIG. 17 is a plan view illustrating a configuration of a liquid crystal display device 100 according to a seventh embodiment of the present invention. In FIG. 17, the same reference numbers are used for the same elements as those described previously, and overlapping descriptions are omitted.

In the present embodiment, as illustrated in FIG. 17, the spacer pattern 39A correspond to a combination of the columnar spacer 39 in FIG. 11 and a feature of the spacer pattern 39A in FIG. 16, that is, the spacer pattern 39A in FIG. 16 has an edge in parallel to the extending direction of the cutout pattern 34A.

Namely, in the present embodiment, the spacer pattern 39A extends over a large area from outside of the pixel region and covers a portion of the pixel electrode 34, and due to this, the TFT glass substrate 31A and the TFT glass substrate 31B are stably supported by the spacer pattern 39A. In this situation, because the spacer pattern 39A has an edge in parallel to the extending direction of the cutout pattern 34A facing itself, the alignment of the liquid crystal molecules 22A is regulated to be perpendicular to the extending direction of the cutout pattern 34A, and this reduces disorder of alignment of the liquid crystal molecules 22A in the pixel regions. Thereby, the liquid crystal display device 100 has good transmittance in the driven state.

Eighth Embodiment

Figure 18A:
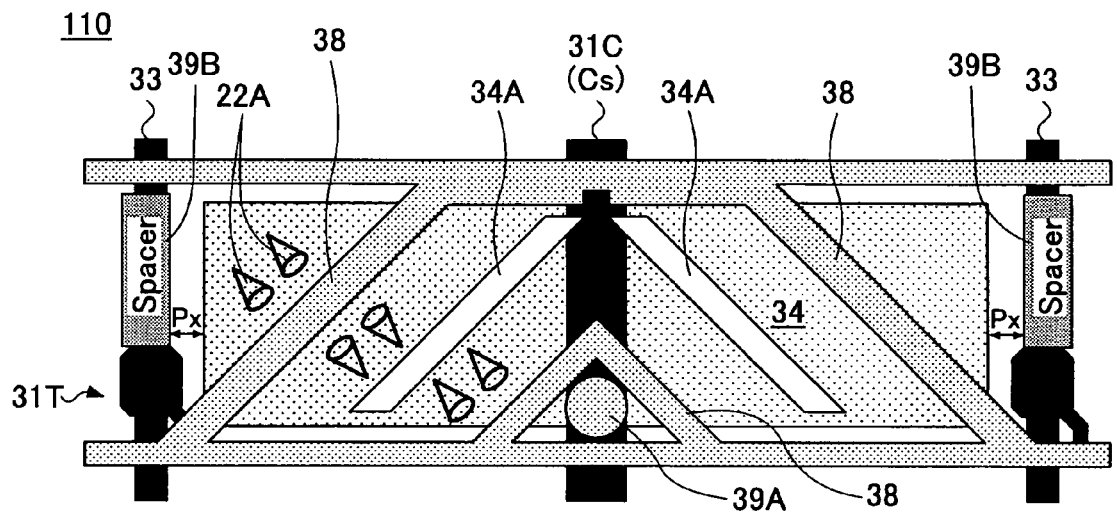
FIGS. 18A through 18C are a plan view and cross-sectional views illustrating a configuration of a liquid crystal display device 110 according to an eighth embodiment of the present invention.
Figure 18B:
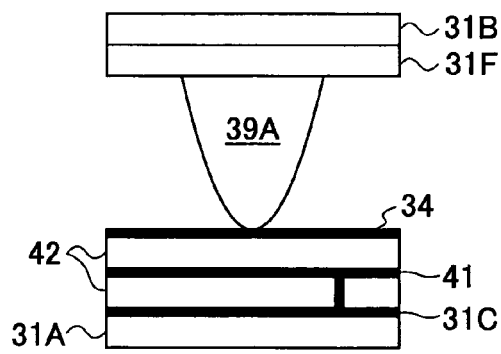
Figure 18C:
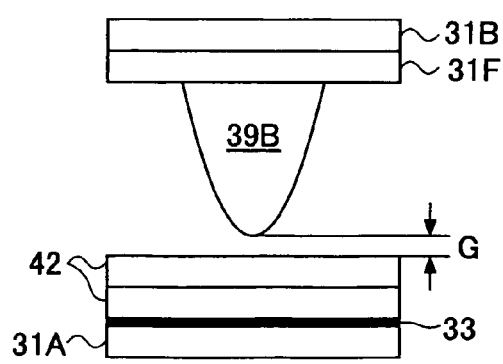

FIGS. 18A through 18C are plan view and cross-sectional views illustrating a configuration of a liquid crystal display device 110 according to an eighth embodiment of the present invention. In FIGS. 18A through 18C, the same reference numbers are used for the same elements as those described previously, and overlapping descriptions are omitted.

As illustrated in FIGS. 18A through 18C, the spacer patterns 39A and 39B in the present embodiment correspond to a combination of the columnar spacer 39 in FIG. 14 and the columnar spacer 39B in FIG. 12.

The columnar spacer 39A as shown in FIG. 14, which acts as a main spacer pattern in the present embodiment, and the columnar spacer 39B as shown in FIG. 12, which acts as a sub spacer pattern in the present embodiment, are obtained by patterning the same resist film deposited on the TFT glass substrate 31B, and have the same height.

Nevertheless, the main spacer 39A is arranged in the pixel region on the glass substrate 31B to face a portion of the TFT glass substrate 31A including a stacked structure of the pixel electrode 34, an intermediate electrode 41, a Cs electrode 31C, and interlayer insulating films 42, and as illustrated in FIG. 18B, the end of the columnar spacer 39A is in contact with the glass substrate 31A. On the other hand, the sub spacer 39B is arranged in the pixel region on the glass substrate 31B to face a portion of the TFT glass substrate 31A including a stacked structure of the scanning electrode 33 and interlayer insulating films 42, as illustrated in FIG. 18C. Thus, there is a gap G, for example, equaling to about 0.2 μm, between the sub spacer 39B and the glass substrate 31A, corresponding to the thicknesses of the pixel electrode 34 and the intermediate electrode 41.

In FIG. 18B and FIG. 18C, illustration of molecule alignment films and other elements are omitted.

Because there is a gap G between the sub spacer 39B and the glass substrate 31A, when an external force is applied to the glass substrate 31A and the glass substrate 31B in the liquid crystal display device 110, the liquid crystal panel is bendable, and this can prevent permanent deformation in the columnar spacer, or other damages to the columnar spacer.

Even in the above configuration, the alignment regulation effect applied by the columnar spacer 39A on the liquid crystal molecules 22A is eliminated by forming the projecting pattern 38 to enclose the columnar spacer 39A on three sides, thereby, the alignment of the liquid crystal molecules 22A is regulated by the projecting pattern 38 and the cutout pattern 34A. In addition, by separating the sub columnar spacer 39B from the transparent pixel electrode 34 by a distance Px, the sub spacer 39B essentially does not cause disorder of alignment of the liquid crystal molecules 22A.

Further, in the above first through eighth embodiments, fine patterns corresponding to the fine structure patterns 24 illustrated in FIG. 4 may be arranged on the transparent pixel electrode 34 while being perpendicular to the cutout 34A.

While the invention is described above with reference to specific embodiments chosen for purpose of illustration, it should be apparent that the invention is not limited to these embodiments, but numerous modifications could be made thereto by those skilled in the art without departing from the basic concept and scope of the invention.

What is claimed is:

1. A liquid crystal display device, comprising:
a first substrate;
a second substrate facing the first substrate;
a liquid crystal layer formed from liquid crystal molecules and held between the first substrate and the second substrate, said liquid crystal molecules being aligned to be substantially perpendicular to the first substrate and the second substrate in an un-driven state, and being aligned to be along a first direction in a plane substantially parallel to the first substrate and the second substrate in a driven state, said un-driven state corresponding to a state in which a driving electrical field is not applied on the liquid crystal layer, said driven state corresponding to a state in which the driving electrical field is applied on the liquid crystal layer;
a pixel electrode formed on at least one of the first substrate and the second substrate;
a patterned structure that is provided on the pixel electrode, extends along a second direction perpendicular to the first direction, and is capable of aligning the liquid crystal molecules to be along the first direction in the driven state, said patterned structure including at least one of a first alignment control pattern formed on the first substrate and extending along the second direction and a second alignment control pattern formed on the second substrate and extending along the second direction; and
a spacer that is arranged between the first substrate and the second substrate to maintain a gap between the first substrate and the second substrate to be a constant, said spacer being separate from the first alignment control pattern and the second alignment control pattern,
wherein the spacer is arranged to cover at least a portion of the pixel electrode so that the spacer is close to the first alignment control pattern and the second alignment control pattern while being separated from the first alignment control pattern and the second alignment control pattern by a predetermined distance, and
the spacer, together with the first alignment control pattern and the second alignment control pattern, align the liquid crystal molecules near the spacer to be substantially along the first direction.

2. The liquid crystal display device as claimed in claim 1, wherein in each pixel electrode, the spacer is provided on the second substrate, and the first alignment control pattern is arranged between the spacer and the second alignment control pattern as viewed in a normal direction.

3. The liquid crystal display device as claimed in claim 1, wherein a distance between the spacer and the alignment control pattern arranged nearest to the spacer and a distance between the first alignment control pattern and the second alignment control pattern arranged nearest to the first alignment control pattern are the same.

4. The liquid crystal display device as claimed in claim 1, wherein the spacer forms an alignment control pattern having an inclined side extending along the second direction.

5. The liquid crystal display device as claimed in claim 1, wherein the spacer forms a continuous pattern extending in the pixel electrode.

6. The liquid crystal display device as claimed in claim 1, wherein the spacer forms an isolated pattern in the pixel electrode.

7. The liquid crystal display device as claimed in claim 1, wherein the spacer is formed on the second substrate, and an end of the spacer is a projecting pattern in contact with the first substrate.

8. The liquid crystal display device as claimed in claim 2, wherein
the first alignment control pattern includes a depressed pattern formed on the first substrate; and
the second alignment control pattern includes a projecting pattern formed on the second substrate.

9. The liquid crystal display device as claimed in claim 8, wherein the depressed pattern includes a cutout pattern formed in a pixel electrode on the first substrate.

10. The liquid crystal display device as claimed in claim 1, wherein another spacer is arranged between the first substrate and the second substrate.

11. The liquid crystal display device as claimed in claim 10, wherein the another spacer is arranged on one of the first substrate and the second substrate, and does not reach another one of the first substrate and the second substrate.

12. The liquid crystal display device as claimed in claim 1, wherein
each pixel electrode includes a first domain region and a second domain region; and
the first direction in the first domain region perpendicularly intersects with the first direction in the second domain region.

13. The liquid crystal display device as claimed in claim 1, wherein thin film transistors are formed on the first substrate in the respective pixel electrodes.

14. A liquid crystal display device, comprising:
a first substrate;
a second substrate facing the first substrate;
a liquid crystal layer formed from liquid crystal molecules and held between the first substrate and the second substrate, said liquid crystal molecules being aligned to be substantially perpendicular to the first substrate and the second substrate in an un-driven state, and being aligned to be along a first direction in a plane substantially parallel to the first substrate and the second substrate in a driven state, said un-driven state corresponding to a state in which a driving electrical field is not applied on the liquid crystal layer, said driven state corresponding to a state in which the driving electrical field is applied on the liquid crystal layer;
a pixel electrode formed on at least one of the first substrate and the second substrate;
a patterned structure that is provided on the pixel electrode, extends along a second direction perpendicular to the first direction, and is capable of aligning the liquid crystal molecules to be along the first direction in the driven state, said patterned structure including at least one of a first alignment control pattern formed on the first substrate and extending along the second direction and a second alignment control pattern formed on the second substrate and extending along the second direction; and
a spacer that is arranged between the first substrate and the second substrate to maintain a gap between the first substrate and the second substrate to be a constant, said spacer being separate from the first alignment control pattern and the second alignment control pattern,
wherein the spacer is arranged to cover at least a portion of the pixel electrode so that the spacer is close to the first alignment control pattern and the second alignment control pattern, and is separated from the first alignment control pattern and the second alignment control pattern by a predetermined distance,
the spacer is enclosed on three sides by the second alignment control pattern, and
the spacer, together with the first alignment control pattern and the second alignment control pattern, align the liquid crystal molecules near the spacer.

15. A liquid crystal display device, comprising:
a first substrate;
a second substrate facing the first substrate;
a liquid crystal layer formed from liquid crystal molecules and held between the first substrate and the second substrate, said liquid crystal molecules being aligned to be substantially perpendicular to the first substrate and the second substrate in an un-driven state, and being aligned to be along a first direction in a plane substantially parallel to the first substrate and the second substrate in a driven state, said un-driven state corresponding to a state in which a driving electrical field is not applied on the liquid crystal layer, said driven state corresponding to a state in which the driving electrical field is applied on the liquid crystal layer;
a pixel electrode formed on at least one of the first substrate and the second substrate;
a patterned structure that is provided on the pixel electrode, extends along a second direction perpendicular to the first direction, and is capable of aligning the liquid crystal molecules to be along the first direction in the driven state, said patterned structure including at least one of a first alignment control pattern formed on the first substrate and extending along the second direction and a second alignment control pattern formed on the second substrate and extending along the second direction; and
a spacer that is arranged between the first substrate and the second substrate to maintain a gap between the first substrate and the second substrate to be a constant, said spacer being separate from the first alignment control pattern and the second alignment control pattern,
wherein the spacer is arranged out of an area of the pixel electrode and is separated by a distance so that the spacer does not change alignment of the liquid crystal molecules in the liquid crystal,
another spacer is arranged on one of the first substrate and the second substrate,
one of the spacers is arranged on a gate bus line and does not reach the one of the first substrate and the second substrate, and the other one of the spacers reaches the other one of the first substrate and the second substrate, and
the spacer on the gate bus line is a rectangle having a long side along the gate bus line.

16. The liquid crystal display device as claimed in claim 11, wherein
one of the spacers is arranged on a gate bus line and reaches the other one of the first substrate and the second substrate, and the other one of the spacers does not reach the other one of the first substrate and the second substrate.

* * * * *